United States Patent [19]

McCabe

[11] 4,390,123

[45] Jun. 28, 1983

[54] THERMALLY ACTIVATED, AUTOMATIC, SINGLE BLADE DAMPER AND DAMPER OPERATOR

[76] Inventor: Francis J. McCabe, 239 Hastings Ct., Doylestown, Pa. 18901

[21] Appl. No.: 229,829

[22] Filed: Jan. 30, 1981

Related U.S. Application Data

[63] Continuation-in-part of Ser. No. 211,914, Dec. 1, 1980, Pat. No. 4,372,485.

[51] Int. Cl.³ .................. G05D 23/00; F23H 3/00
[52] U.S. Cl. ........................................ 236/16; 110/163
[58] Field of Search .................. 236/16, 93 R, 49; 110/163; 126/285 R, 288, 289, 292, 293, 296

[56] References Cited

U.S. PATENT DOCUMENTS

| | | | |
|---|---|---|---|
| 2,285,749 | 6/1942 | Stuart | 236/1 G |
| 2,493,736 | 1/1950 | Brown | 251/11 |
| 3,009,473 | 11/1961 | Hennen | 137/315 |
| 3,366,333 | 1/1968 | Diehl | 236/93 |
| 3,532,321 | 10/1970 | Bowman et al. | 251/175 |
| 3,543,439 | 12/1970 | Pantland | 49/7 |
| 3,580,238 | 5/1971 | Diehl | 126/295 |
| 3,725,972 | 4/1973 | McCabe | 16/48.5 |
| 3,796,249 | 3/1974 | McCabe | 160/1 |
| 3,889,314 | 6/1975 | McCabe | 16/48.5 |
| 3,921,900 | 11/1975 | Cole | 236/93 |
| 3,976,245 | 8/1976 | Cole | 236/93 A |
| 4,040,304 | 8/1977 | McCabe | 74/230.17 T |
| 4,041,570 | 8/1977 | McCabe | 16/48.5 |
| 4,074,388 | 2/1978 | McCabe | 16/48.5 |
| 4,080,978 | 3/1978 | McCabe | 137/79 |
| 4,099,292 | 7/1978 | McCabe | 16/48.5 |
| 4,114,805 | 9/1978 | Humphreys et al. | 236/1 G |
| 4,123,001 | 10/1978 | Kolt | 236/49 |
| 4,146,048 | 3/1979 | McCabe | 137/75 |
| 4,152,377 | 5/1979 | Takata | 261/39 B |
| 4,165,359 | 8/1979 | Thomas et al. | 422/105 |
| 4,175,695 | 11/1979 | Cresswell | 236/1 G |
| 4,195,384 | 4/1980 | McCabe | 16/48.5 |
| 4,200,954 | 5/1980 | McCabe | 16/48.5 |
| 4,205,706 | 6/1980 | Jasensky | 138/89 |
| 4,205,783 | 6/1980 | Dietsche et al. | 236/1 G |
| 4,213,227 | 7/1980 | McCabe | 16/48.5 |
| 4,219,041 | 8/1980 | McCabe et al. | 137/79 |
| 4,225,080 | 9/1980 | Barth | 236/1 G |
| 4,241,748 | 12/1980 | McCabe | 137/77 |
| 4,289,271 | 9/1981 | Barth | 236/1 G |

FOREIGN PATENT DOCUMENTS 7520690 1/1977 France ..................... 137/75

OTHER PUBLICATIONS

Titus Dampers for Round Neck Ceiling Diffusers–No. 139.
ETL Electro-Thermal-Link: Options and Accessories.

*Primary Examiner*—Edward G. Favors
*Attorney, Agent, or Firm*—Benasutti and Murray

[57] ABSTRACT

For a single blade damper, an improved damper operator including a bimetallic element, one end of which is attached to the frame of the damper, and the other end of which is pivotally associated with a bracket connected to the damper blade.

15 Claims, 7 Drawing Figures

THERMALLY ACTIVATED, AUTOMATIC, SINGLE BLADE DAMPER AND DAMPER OPERATOR

RELATED CASES

This is a continuation-in-part of my prior copending patent application Ser. No. 211,914, filed Dec. 1, 1980, U.S. Pat. No. 4,372,485 and entitled "Thermally Activated, Automatic Damper and Damper Operator".

BACKGROUND OF THE INVENTION

The present invention relates generally to dampers, and more particularly, to a thermal operator for use with such dampers.

A problem commonly encountered in conjunction with the use of many oil and gas fired home and hot water heaters, as well as wood and coal burning stoves and fireplaces, is that smoke and gases are constantly produced. These fumes must therefore be vented to the outside through a chimney or flue. This is done both to create proper draft conditions for combustion and to avoid creating conditions hazardous to the inhabitants of the building where such heating systems are being used. However, such a vent creates a permanent opening which, when the system is not being used, allows heat to escape from the structure being heated, creating the potential for considerable energy losses and, accordingly, considerable operating expenses.

In recognition of this problem, a variety of dampers have been developed which are capable of being fitted into the vent or chimney of the heating system to block this vent opening in a manner which conserves residual heat contained within the building, thus reducing the rate of fuel consumption. Essentially, such dampers generally use an external sensor to actuate the damper operator and thereby open or close the damper as needed. For example, U.S. Pat. No. 4,123,001, issued to Kolt, and U.S. Pat. No. 3,921,900, issued to Cole, both show bellows actuated systems for use with such dampers. U.S. Pat. No. 4,205,783 issued to Dietsch, discusses spring biasing means for use with a motor operated damper. However, the problems and expenses encountered in adapting such actuator systems to the damper and the associated chimney structure, as well as the cost of the power frequently required to operate such actuator systems, can be significant, often negating the savings afforded by the reduction of heat losses provided by the damper.

It is therefore preferable that the damper be self actuating, so that when placed into a vent or flue, the damper can respond directly and automatically to the presence or absence of heat or pressure to open or close. Using such a system, no external source of power would be required, providing a substantial savings in cost. Moreover, this permits such a damper to be located in plates where excessive heat loads exist, which can quickly degrade electrical sensor wiring, or where external power lines are difficult or expensive to install. Further, such dampers would be easier to adapt to a wide variety of operating conditions with a minimum of alteration or modification. Such capabilities can provide significant savings, both in the initial fabrication of the damper, as well as in the field installation and ultimate use of that damper.

One approach which has been used in an effort to meet this need for a self actuating damper involves the use of a plurality of interleaved bimetallic flaps, usually four, which are capable of reciprocally folding open and closed according to the ambient temperature within the flue. However, such a device tends to suffer from a number of disadvantages. For example, each flap must be self actuating, and therefore must be fabricated from relatively expensive bimetallic materials. Moreover, such materials, while flexible to some degree, are generally unable to completely fold out of the path of exiting smoke or fumes, thus creating a chimney restriction. This, at best, reduces furnace efficiency by reducing chimney draft, and at times, can even cause smoke and gaseous combustion products to back up within the system and escape into the building. Another disadvantage of such a damper is that the flaps must be specifically sized in order for the damper to be useful in a variety of applications. This adds to the normal scrap losses encountered in producing such a damper, adding significantly to its cost of production. Lastly, bimetallic material is relatively stiff. As a result, flaps manufactured using such materials do not respond quickly. Because of this, in furnaces where an increase in pressure can occur before an increase in temperature, for example in oil fired furnaces, such flaps are unable to open quickly enough to relieve the pressure produced. It is for this reason that such damper systems are not recommended for use with oil fired furnaces.

The foregoing disadvantages are further accentuated as the size of the damper is decreased to meet a particular installation requirement. Often, for relatively small dampers, the use of a plurality of folding blades or interleaved flaps is inappropriate, due in part to the precision required to manufacture the components of the damper, and to the amount of structure which must be encountered as air flows through the damper assembly. For this reason, single blade dampers are often used in such applications.

It is therefore desirable to provide a damper having a self actuating damper operator and which can be constructed of low cost, general purpose components, yet which is readily adaptable to a wide variety of installation situations and operational conditions. Such a system would significantly reduce, if not entirely eliminate, the foregoing problems.

SUMMARY OF THE INVENTION

In accordance with the present invention, a novel damper operator is provided which is capable of obviating the foregoing problems. Although the damper operator of the present invention can be used in conjunction with a wide variety of damper constructions, the following discussion primarily relates to its use with single, rotating blade-type dampers. Basically, such dampers include a single blade having a centrally disposed hinge element which is pivoted for rotation within the damper frame. In the fully open position, the blade is caused to assume a position which is substantially parallel to the air flow within the duct, so that only the thin blade edge is contacted by the air flow, thus minimizing resistance to the air flow through the duct. In the fully closed position, the blade is rotated to a position which substantially seals the duct which has been provided with the damper.

In accordance with the present invention, the damper is provided with a self actuating damper operator mechanism which generally comprises a bimetallic, serpentine thermal spring element, one end of which is attached to the damper frame, and the other end of which is pivotally associated with the blade of the damper. Operation of the damper occurs when the ambient temperature surrounding the thermal spring element changes.

For example, the damper and damper operator of the present invention can be used in the capacity of a flue damper, if desired. In such case, the thermal spring element is set so that the blade normally assumes its closed position. As the element is heated, its bimetallic structure causes it to flex. This causes the attached blade to pivot to its open position. When the thermal spring element is cooled, the reverse effect occurs and the blade is again closed. This operation is continuous and passive, since no external sensor means or power source is needed to obtain these results.

In addition to providing a substantially improved flue damper, the damper operator of the present invention is also capable of use in conjunction with other damper applications, one example being ceiling mounted smoke/fire dampers. In such an application, the damper generally complements a fire rated secondary ceiling, to prevent heat damage to the primary ceiling and its structural support for a rated time period; or permits smoke to be ventilated from the room provided with the damper. For smoke dampers, the thermal spring element is caused to operate as described above, causing the blade to open when heated, to permit smoke to escape from the room, and to close when cooled. For fire dampers, operation of the thermal spring element is reversed, so that the blade closes when heated and opens when cooled.

Further, the damper operator of the present invention can be used to provide a control damper for use with air-conditioning systems. In this application, the damper is caused to respond to changes in room temperature, so that the conditioned air admitted to a selected area can be regulated to maintain a uniform temperature therein. However, in such an application it is generally necessary to avoid system imbalances by assuring that there is always some minimum amount of air being admitted into any given area. This is accomplished by providing a means for volume adjustment which is capable of assuring that the blade of the damper remains open a sufficient amount to assure the maintenance of a proper flow through the air duct within which the damper is placed.

Lastly, in pilot operated systems or remotely controlled systems, an additional, remote operator can be provided for use with the damper operator of the present invention to further control the opening and closing of the damper and thus, to remotely maintain stable operating conditions within the system.

Thus, the primary object of the present invention is to provide a single blade damper having a passive, self actuating damper operator.

A further object of the present invention is to provide a damper operator capable of causing a single blade damper to open and close in response to a selected stimulus.

A further object of the present invention is to provide an adjustment means for a damper operator which can provide a selected minimum or maximum flow rate through a single blade damper with which it is associated.

These and other object of the present invention will become apparent from the following detailed description, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENT

Although specific forms of the invention have been selected for illustration, and the following description is drawn in specific terms for the purposes of describing these forms of the invention, this description is not intended to limit the scope of the invention which is defined in the appended claims.

Figure 1:
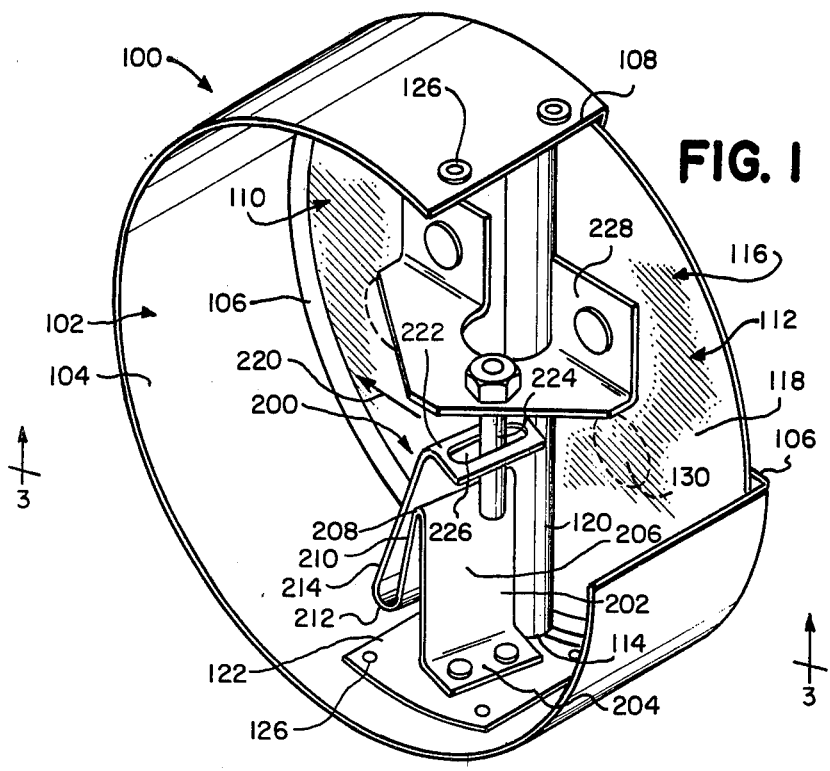
FIG. 1 is an isometric view of a single blade damper, also showing the damper operator of the present invention, portions of which have been broken away to show internal construction detail.
Figure 2:
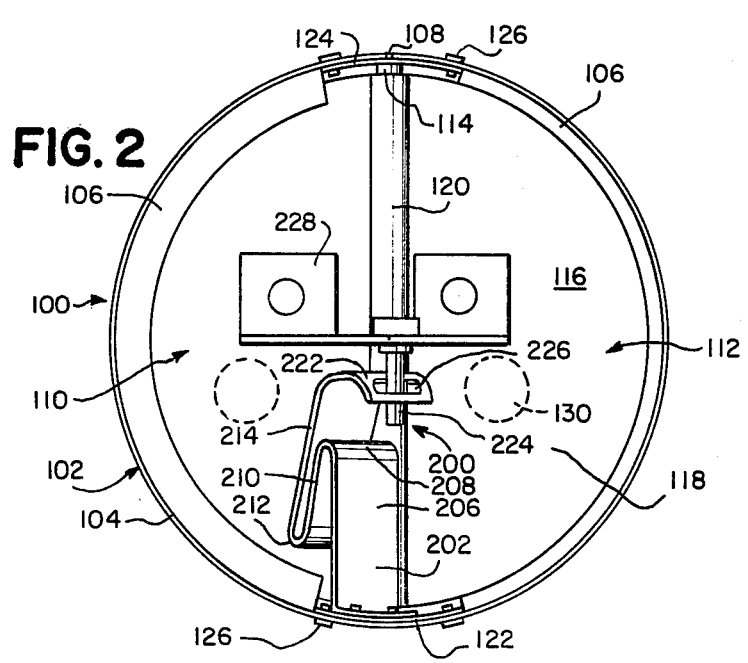
FIG. 2 is a top plan view of the damper of FIG. 1.
Figure 3:
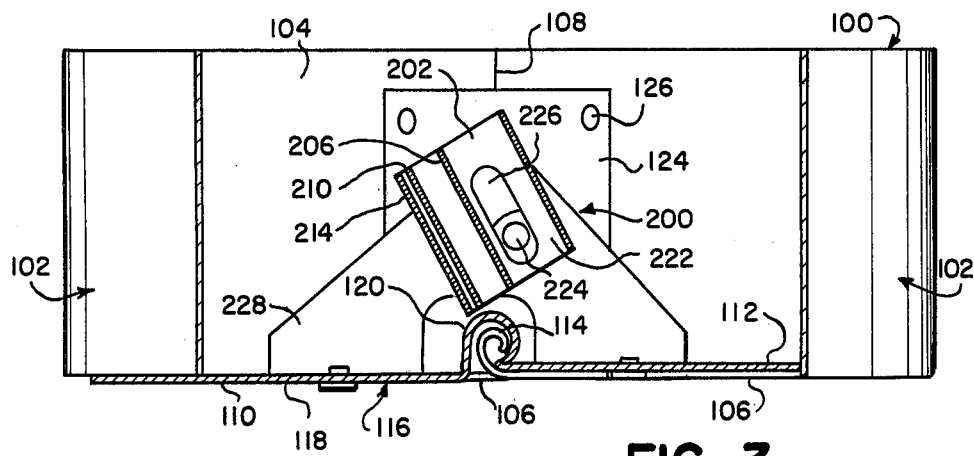
FIG. 3 is a cross-sectional view of the damper of FIG. 1, taken along line 3—3 in FIG. 1, showing the damper in its closed state.

Referring now to the drawings, FIG. 1 shows a preferred embodiment single blade damper, designated generally as 100. As shown, the damper 100 is substantially circular, having a frame 102 which includes a peripheral wall 104 and an inwardy depending flange 106. The wall 104 of the damper frame 102 is connected together by welding, riveting or some other means of attachment to form a substantially circular shape at the weld line 108. It is, of course, not necessary for the damper frame 102 to be circular in cross-section, it being clearly understood that similar damper frames can be formed to fit within any of a number of duct shapes, examples being those having square or rectangular cross-sections.

Pivotally attached within the damper frame 102 is a damper blade 116 which includes a substantially planar surface 118 having a diameter slightly less than that of the wall 104 of the damper frame 102, and a hinge 120 substantially centrally disposed along the surface 118 of the damper blade 116. Each end of the hinge 120 is pivotally attached to the damper frame 102 by the retention brackets 122, 124, so that one portion 110 of the damper blade 116 extends outwardly from the flange 106, and so that the other portion 112 of the damper blade 116 extends inwardly from the flange 106. Such pivotal engagement is accomplished by providing each of the brackets 122, 124 with a protrusion 114 which corresponds to the hinge 120 of the damper blade 116. Each bracket 122, 124 is attached to the wall 104 of the damper frame 102 using any of a variety of conventional techniques, such as the rivits 126 illustrated.

The blade 116 is then capable of rotation within the damper 100, from an open to a closed position. In its open position, the blade 116 is folded out of the way of the air flow, so that it is substantially parallel to the direction of the air flowing through the damper. In this manner, only the relatively thin edge of the blade 116 is contacted by the air flow, minimizing resistance to that air flow through the damper 100. In its closed position, the blade 116 is folded downwardly so that the blade portions 110, 112 rest on the flange 106 of the damper frame 102, which serves to substantially seal the duct in which the damper 100 is housed.

In many damper applications, it is necessary to assure that a continuous stream of combustion products can be emitted from the system, rather than being trapped in that system. That is particularly so with regard to coal and wood stoves, as well as pilot operated gas heaters and hot water heaters. In order to accommodate this need, the blade 116 can be provided with one or more knock-out sections 130 which can be removed when the damper is installed, providing a continuous opening through which such combustion products are able to pass.

Referring now to FIGS. 1-4, the damper operator 200 of the present invention may now be described. As shown, the damper operator linkage 200 generally comprises a serpentine shaped, bimetallic spring element 202, one end of which is attached to the damper frame 102, and the other end of which includes a slot 226 pivotally associated with a pivot pin 224 which extends outwardly from a mounting bracket 228 attached to the inwardly directed portion 112 of the damper blade 116. To enhance operation of the damper operator 200, it is preferred that the bimetallic element 202 be attached to the frame 102 of the damper 100 in an orientation which advances the bracket 228 outwardly and away from the plane defined by the damper blade 116 when the damper operator 200 is actuated. However, other orientations may also be used if desired.

The serpentine, bimetallic element 202 generally includes a base portion 206, which terminates at a flange 204 used to attach the element 202 to the wall 104 of the frame 102; a first bend 208 which substantially reverses the extension of the bimetallic element 202; a first mid-portion 210 which extends from the first bend 208, back over portions of the base portion 206, in a direction which preferably diverges from the base portion 206; a second bend 212 which extends from the mid-portion 210; and a second mid-portion 214 which extends from the second bend 212 to a position located beyond the first bend 208. The second mid-portion 214 has a terminating end portion 222 which curves away from the second mid-portion 214 as shown, and which includes the slot 226 which is used to engage the pivot pin 224 of the bracket 228.

It is preferred that the bends 208, 212 have as small a radius as is possible, to maximize spring action. It has been found that a radius of curvature on the order of $\frac{1}{8}''$ is adequate for this purpose. However, in order to maximize performance, the bends should be made around a curved mandrel, rather than being folded over a sharp point, to provide maximum resistance to stress cracking.

Figure 4:
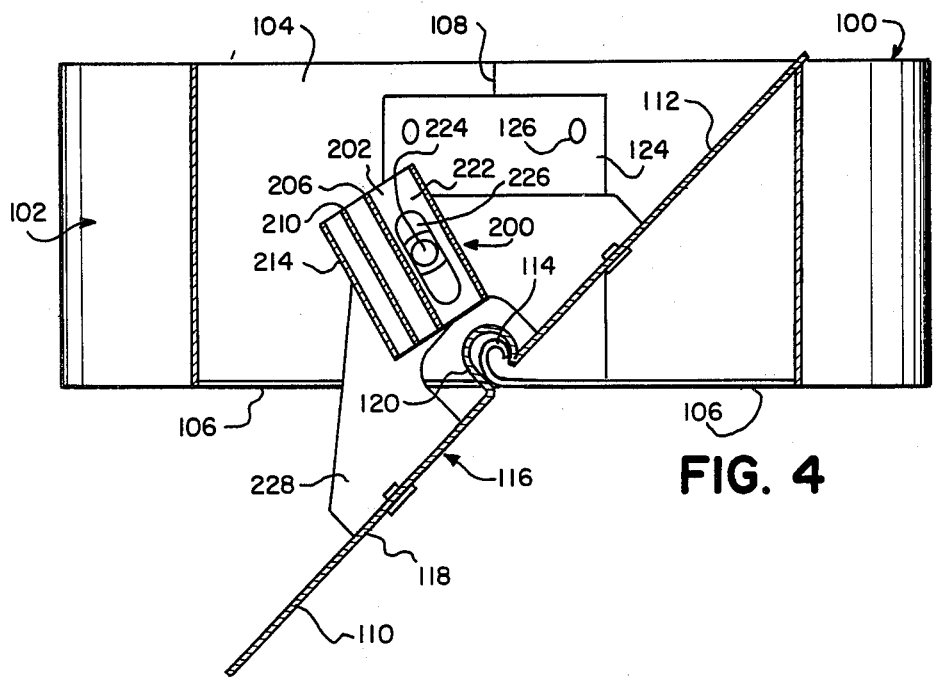
FIG. 4 is a cross-sectional view of the damper of FIG. 1, showing the damper in its open state.
Figure 7:
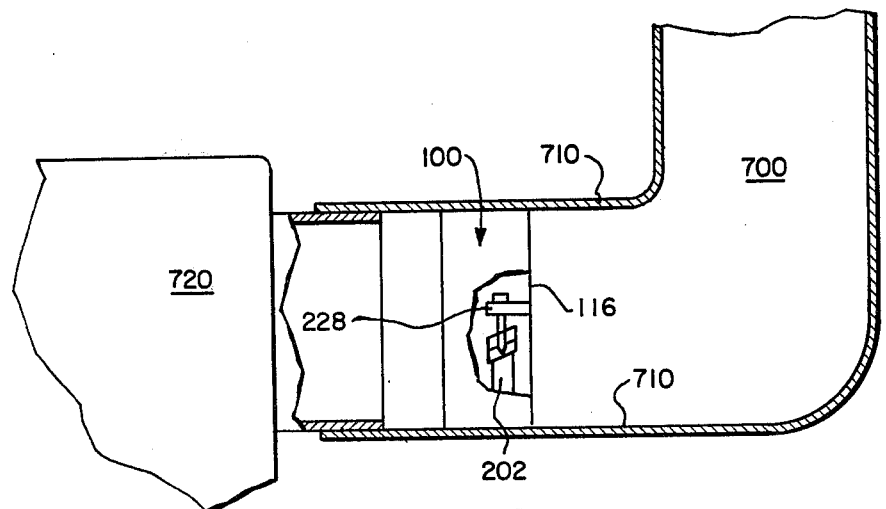
FIG. 7 is a partial, side elevational view illustrating installation of the damper of FIG. 1 in an exhaust flue.

After assembly, the damper 100 and damper operator 200 previously described are ready for installation in a chimney or duct 700, an example of one such installation being shown in FIG. 7. In this case, the installation is being used as a flue damper, the damper operator 200 being positioned within the duct 700 so that the frame 102 of the damper engages the side walls 710 of the duct 700, and so that the bimetallic spring element 202 faces the source of heat 720. Under cool conditions, the operator 200 is contracted so that the blade 116 assumes a position which substantially seals the heat source 720 from the exhaust flue 700. As the temperature increases, due to operation of the heat source 720, the bimetallic element 202 is heated. Due to the nature of the bimetallic material which comprises the element 202, this causes the element 202 to expand, so that the end 222 of the element 202 advances in the direction of the arrow 220. As this occurs, the pivot pin 224 is drawn in the direction of the arrow 220, which causes the blade 116 to rotate to its open position, as illustrated in FIG. 4, so that the blade 116 is substantially parallel to any air flowing through the duct 700. When the source of heat is discontinued, the bimetallic element 202 cools and contracts, which pulls on the pivot pin 224, causing the blade 116 to again close. The slot 226 is provided to assure free movement between the end 222 of the element 202 and the pivot pin 224 of the bracket 228.

The bimetallic element 202 is capable of being fabricated to operate at a wide range of selected temperatures, and to do so with varied response rates. This may be done without affecting, to any significant degree, the cost of either the operator element or the damper to which it is attached. Furthermore, in the configuration shown, with proper care regarding fabrication techniques, essentially 100% of the bimetallic material can be used, holding losses due to scrap or waste to a minimum.

The foregoing describes use of the damper operator 200 of the present invention to provide the function of a flue damper; one which is to open in the presence of heat. However, the damper operator 200 of the present invention is also capable of being used to provide the function of a fire damper; one which is to close when a fire occurs. To do so, all that need be done is to reverse the orientation of the materials comprising the bimetallic spring element 202, so that when the element 202 is heated, the element 202 causes the blade 116 of the damper to be pulled closed; and so that when cooled, the element 202 expands, so that the blade 116 is pushed open.

Moreover, the thermal operator 200 of the present invention is not limited to reciprocation between a fully open and a fully closed position. Rather, with relatively simple modifications, it is possible to adapt the damper 100 and the damper operator 200 for use in conjunction with a variety of air handling needs in which the damper 100 must be opened or closed from some intermediate, partially open position. Such a capability permits the damper 100 and the damper operator 200 to be used in conjunction with multi-branched air-conditioning systems, in which it is necessary to balance the system by presetting maximum or minimum air flow rates within each branch of the system, while retaining some degree of flexibility in adjusting individual air flow rates in response to changes in thermal loading in one or more of the rooms being serviced by the system. This capability can be achieved by providing the damper 100 and damper operator 200 of the present invention with a volume control adjustment mechanism 250.

Figure 5:
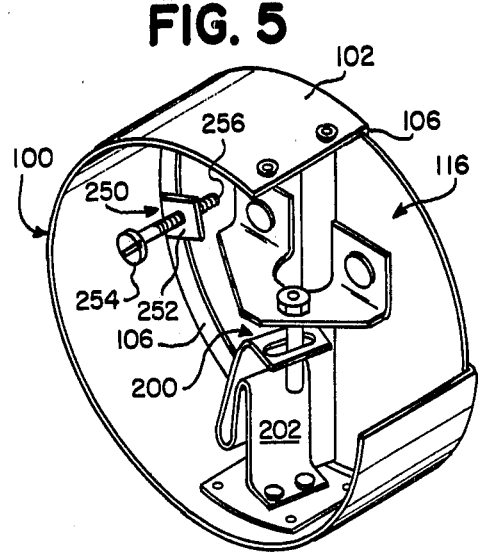
FIG. 5 is a partial, isometric view of a damper which has been provided with means for air control.

FIG. 5 illustrates one volume control adjustment mechanism 250 whch may be used for this purpose. As illustrated, the adjustment mechanism 250 generally comprises a mounting bracket 252 attached to and extending outwardly from the flange 106 of the damper frame 102, and a bolt or screw 254 which threadingly engages the bracket 252 so that its terminating end 256 extends outwardly and into contact with the damper blade 116. Rotation of the adjustment screw 254 causes the end 256 of the screw to advance toward and away from the blade 116, opening the damper blade 116 against the tension developed by the bimetallic, spring element 202. In this manner, the damper blade 116 is maintained in a selected, partially open position, unless further movement of the blade 116 is caused to occur by operation of the element 202. In FIG. 5, the adjustment screw 254 is shown as advancing outwardly from the frame 102 of the damper 100, to contact the outwardly extending portion 110 of the damper blade 116. It is also possible for the screw 254 to extend inwardly, toward the frame 102 of the damper 100, to contact the inwardly extending portion 112 of the damper blade 116, if desired.

Other adjustment means 250 may also be developed which provide similar results. For example, an adjustment screw may be positioned to extend through the mid-portions 210, 214 of the element 202, to its base portions 206. By rotating the screw, the extension of the element 202 is regulated, in turn regulating the angular positioning of the blade 116. Other mechanisms are also possible.

Figure 6:
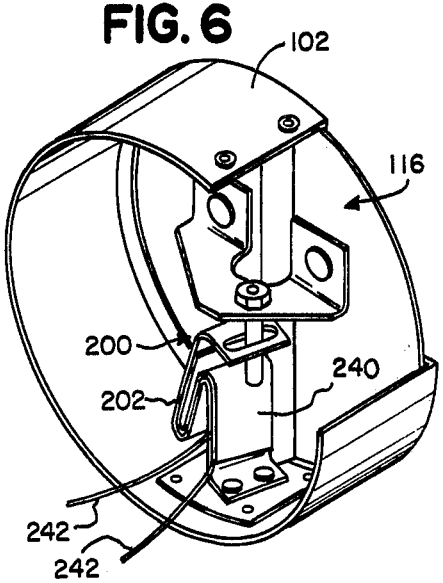
FIG. 6 is a partial, isometric view of a damper and damper operator having means for permitting remote operation of the damper.

In some applications, it is desirable to provide the damper 100 and damper operator 200 with a capability for remote operation. This is readily accomplished by providing the bimetallic element 202 of the damper operator 200 with a heating element 240, as illustrated in FIG. 6. The heating element 240 is placed in contact with the bimetallic element 202 so that, when operated, the heat produced by the element 240 serves to operate the element 202, and therefore the damper blade 116, as previously described. Actuation of the heating element 240 may be accomplished, for example, by applying a current through the connection wires 242, which may be connected, as needed, to an appropriate control system, thereby providing a means for remotely controlling operation of the damper 100. Of course, other means may be used to heat and cool the element 202 if preferred. In fact, it may even be possible to apply a current directly to and between the ends of the element 202, so that the inherent resistivity of the material comprising the element 202 can produce the heat necessary to cause operation of the bimetallic element 202, and thus the damper operator 200.

Although the foregoing serves well to satisfy the objectives previously set forth, it will be understood that each of the damper operators previously described may be modified in order to meet a variety of operational conditions. For example, the size of the operator used can be altered as needed. So too can the number of bends which form the operator spring. Various other linkages may be developed to achieve proper rotation of the damper blade 116, if desired, in addition to those previously described. Other modifications are also possible.

It will therefore be understood that various changes in the details, materials and arrangement of the parts which have been herein described and illustrated in order to explain the nature of this invention, may be made by those skilled in the art within the principle and scope of the invention as expressed in the following claims.

What is claimed is:

1. For a damper having a frame and a reciprocal blade operatively associated with the frame, an improved damper operator comprising:
   a. a bimetallic element, one end of which is fixedly connected to the frame; and
   b. a linkage, pivotally connected to another end of the bimetallic element and attached to face portions of the blade of the damper;

so that reciprocating movement of the bimetallic element causes the blade to rotate within the damper frame.

2. The damper of claim 1 wherein the bimetallic element is a serpentine spring having a plurality of bends.

3. The damper of claim 1 wherein the bimetallic element is attached to the frame in an orientation capable of advancing the linkage outwardly and away from the plane defined by the damper blade.

4. The damper of claim 1 wherein the bimetallic element is positioned within a duct housing the damper so that the bimetallic element faces a potential heat source.

5. The damper of claim 1 wherein the damper is a single blade damper.

6. The damper of claim 1 which further comprises means for maintaining the damper blade at a selected position intermediate a fully open and fully closed position.

7. The damper of claim 6 wherein the maintaining means is adjustable.

8. The damper of claim 7 wherein the adjustable maintaining means is a threaded screw engaging a bracket attached to the frame of the damper and extending outwardly and into contact with the damper blade.

9. The damper of claim 1 which further comprises means for remotely operating the bimetallic element, attached to surface portions of the bimetallic element.

10. The damper of claim 9 wherein the means for remote operation is an electrically operated heating element operatively associated with the bimetallic element.

11. The damper of claim 1 wherein the damper blade and operator are located within the damper frame.

12. The damper of claim 1 wherein the reciprocating movement of the bimetallic element causes reciprocating movement of the pivotal connection between the linkage and the bimetallic element, thereby causing the blade to rotate with respect to the damper frame.

13. The damper of claim 6 wherein the maintaining means is capable of being fully contained within a duct housing the damper.

14. For a damper having a frame and a single reciprocal blade pivotally associated with the frame, an improved damper operator comprising:
   a. a bracket attached to face portions of the blade and including a pivot pin attached thereto; and
   b. a bimetallic element, one end of which is fixedly connected to the frame, and the other end of which is pivotally connected to the pivot pin;

so that reciprocating movement of the bimetallic element causes the blade to rotate within the damper frame.

15. The damper of claim 14 wherein the bimetallic element extends directly between the damper frame and the pivot pin of the bracket.

* * * * *